July 1, 1958 B. S. DALTON 2,841,476
APPARATUS FOR CONTACTING SOLIDS WITH GASES
Filed July 16, 1953
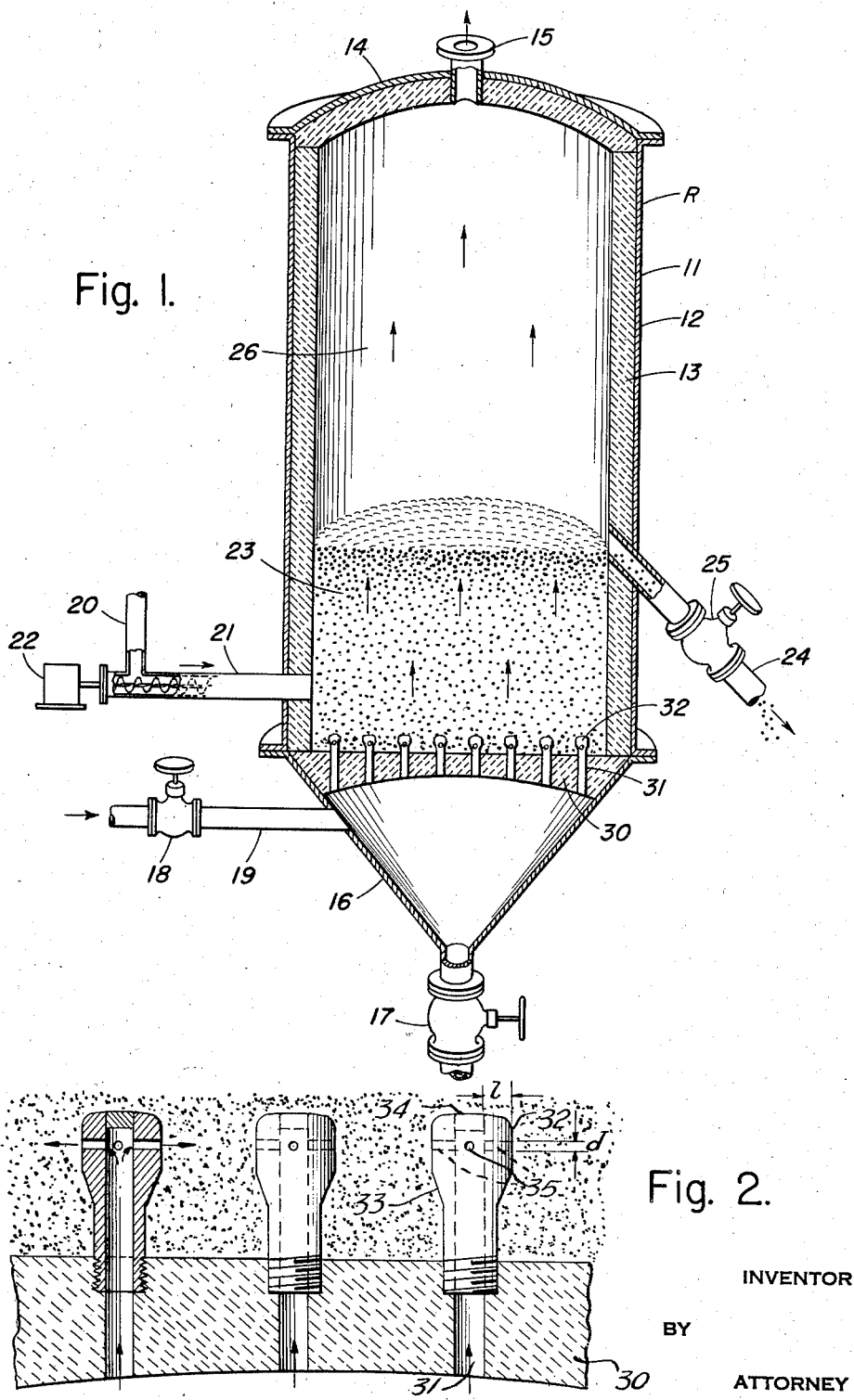

United States Patent Office 2,841,476
Patented July 1, 1958

2,841,476
APPARATUS FOR CONTACTING SOLIDS WITH GASES

Benjamin S. Dalton, Riverside, Conn., assignor to Dorr-Oliver Incorporated, Stamford, Conn., a corporation of Delaware Application July 16, 1953, Serial No. 368,425

1 Claim. (Cl. 23—284)

This invention relates generally to the art of contacting finely-divided solids with gases in accordance with the well known solids-fluidization technique. More particularly it relates to improved ways and means for carrying out such processes wherein, upon shutdown and defluidization, the finely divided solids are automatically prevented from sifting out of the treatment bed.

In normal fluidizing processes a bed of fluidizable solids (dust up to ½ inch or so) is supported upon a horizontally positioned apertured constriction plate and the solids are fluidized or rendered as a dense homogeneous and turbulently mobilized suspension by the controlled upward passage of gases through the apertured plate and the bed of solids.

In many instances it is required to shut down such solids fluidizing reactors. When this occurs, the bed solids which are normally smaller in size than the apertures in the constriction plate, will sift or flow downwardly through the plate thus depleting the bed and accumulating in the windbox beneath the plate. This sifting results in an undesirable displacement of the furnace burden from the treatment zone into the windbox.

So it is one object of this invention to provide ways and means for avoiding this displacement of solids during periods of defluidization so that they are retained in the bed and are thus available for restarting fluidizing operations.

A further disadvantage of present fluidizing practice resides in the fact that the fluidizing gases pass vertically upwardly through the apertured constriction plate thence directly vertically upwardly through the bed of solids undergoing fluidization. In many cases, particularly where high gas rates are used, this direct vertical gas passage results in improper gas distribution throughout the bed so that channeling occurs in the bed and proper fluidization is impossible to attain. I have discovered that proper gas distribution within the bed can be attained by introducing the fluidizing gases into the bed as a plurality of horizontally directed streams so that the gases become thoroughly and completely distributed through the bed before and during their upward passage therethrough. This horizontal gas introduction provides an additional advantage in that for some unexplained reason it minimizes abrasion among the solids within the bed.

So it is a further object of this invention to provide ways and means for initially introducing fluidizing gases into the bed of solids as a series of horizontal streams to thereby insure complete distribution of gases within the bed.

These and possibly other objects are attained by providing the constriction plate apertures with vertically extending sift-preventing inserts comprising a hollow member having a top and sides, and provided with laterally directed gas passages in the sides.

The laterally directed gas passages provide the aforementioned horizontal gas entry while the sifting of defluidized solids is prevented by making the gas passages as of sufficient horizontal extent so that it will contain the normal angle of reposal of defluidized solids thereby preventing their flow out through the gas inlets.

Actual embodiments of the invention may take a variety of forms at least some of which are shown in the accompanying drawings which illustrate the invention so that it may be more readily understood and carried into effect.

In the drawings Figure 1 is a cutaway view showing a typical fluidized solids reactor.

Figure 2 is an enlarged view of a section of a construction plate showing details of non-sifting horizontal air entry devices.

In Figure 1 there is shown a reactor R comprising a cylindrical section 11 having a metal outer wall 12 and lined with refractory material 13. The reactor has a top 14 with an exit gas conduit 15. A windbox or coned section 16 having valved cleanout conduit 17 is provided at the reactor bottom.

Located in the bottom of the cylindrical section 11 and extending throughout its cross-sectional area is solids supporting constriction plate 30 which is provided with gas admitting apertures such as at 31 in which there are fitted inserts such as at 32 the construction of which is more fully described hereinafter.

For operation, fluidizing and/or treatment gas is admitted into windbox 16 via valve 18 and conduit 19 while finely-divided solids are introduced into cylindrical section 11 via conduit 20 and screw feeder 21 which is driven by motor 22. The incoming feed solids form bed 23, the upper level of which is controlled by overflow pipe 24 and valve 25. Above bed 23 is an overlying freeboard space 26. The bed is fluidized by gases entering through the inserts 32 of plate 30.

If heat is required for start up, such as initially starting pyrite roasting, or for continued operation then it may be supplied by preheating the gases or by external torches or by any other well known means such as burning fuel in the bed itself.

In Figure 2 there is shown a partial section of a constriction plate 30 having apertures such as at 31. Sift-preventing inserts such as at 32 are provided. These inserts comprise a generally-tubular hollow member 33, a top 34 in the form of an inside plug integral with the tubular member, and elongated gas passages 35 in straight line direct communication with the hollow interior of the tubular member 33 are of sufficient depth that dimension 1 and dimension $d$ coordinate to prevent the sifting of defluidized solids through passages 35 and apertures 31. The sift-prevention is through the concept of containing the normal angle of reposal of the defluidized solids by having the side walls of sufficient thickness so that the length of each elongated passage is greater than the distance that reposed or subsided solids enter into the passage. In other words, it is known that finely divided solids, when subsided or non-fluidized will form a cone shaped pile, and this invention provides elongated gas passages of length greater than the portion of the base of such cone shaped pile entering any of the passages.

What I claim is:

In gas-solid contacting apparatus including a chamber, a horizontally disposed apertured plate in said chamber, a mass of finely divided solids supported on said plate and adapted to subside thereon when non-fluidized, and means for passing fluidizing gases through said apertures to fluidize such solids; improved gas introduction means adapted to limit passage of solids into said apertures when such solids are subsided, said means comprising an insert in each aperture, said insert comprising a tubular hollow member extending upwardly from said aperture, said member being open at the bottom and closed at the top and having side walls of substantial thickness, a plurality of horizontally and radially directed openings in said side walls defining elongated gas passages in straight line communication with the interior of said member, said inserts being surrounded by said solids whereby during periods of non-fluidization subsided solids enter into said elongated passage, and the side walls of said vertical members being of thickness such that the length of said elongated horizontal passages is greater than the distance of entry of said subsided solids into said passage.

References Cited in the file of this patent

UNITED STATES PATENTS

| | | |
|---|---|---|
| 2,378,157 | Ramseyer et al. | June 12, 1945 |
| 2,444,990 | Hemminger | July 13, 1948 |
| 2,556,301 | Squires et al. | June 12, 1951 |
| 2,580,827 | Payne | Jan. 1, 1952 |
| 2,607,662 | Huff | Aug. 19, 1952 |
| 2,639,973 | Fritz | May 26, 1953 |